UNITED STATES PATENT OFFICE.

HERBERT H. KREUTZMANN, OF HILLSBORO, WISCONSIN.

COMPOSITION FOR MAKING DENTAL IMPRESSIONS.

1,222,773.  Specification of Letters Patent.  Patented Apr. 17, 1917.

No Drawing.  Application filed June 19, 1916.  Serial No. 104,403.

*To all whom it may concern:*

Be it known that I, HERBERT H. KREUTZMANN, residing at Hillsboro, in the county of Vernon and State of Wisconsin, have invented a certain new and useful Composition for Making Dental Impressions, of which the following is a specification.

My invention has for its object to provide an impression plaster for dentists' use which is quick-setting, inexpensive to manufacture and not unpleasant to the taste.

The invention consists of a compound composed of plaster of Paris 760 grains; sodium chlorid, 35 grains; carmine, $\frac{1}{2}$ grain; orris root (powdered) 1 grain; water $1\frac{1}{2}$ ounces.

The ingredients are thoroughly mixed into the required paste in the usual manner and may be used in an impression cup in order to obtain the impression of the mouth and teeth.

I find from practical experience that the composition referred to is very quick-acting; in fact, it is almost instantaneous in its setting properties, and hence is especially adaptable for the purposes stated.

From the foregoing it is thought the nature and uses of the invention and its advantages over the compositions of the prior art will be clear to those skilled in the art to which the invention relates.

What I claim is:—

The herein described composition of matter consisting of plaster of Paris 760 grains, sodium chlorid 35 grains, carmine $\frac{1}{2}$ grain, orris root (powdered) 1 grain, and water $1\frac{1}{2}$ ounces.

HERBERT H. KREUTZMANN.